United States Patent [19]

Christmann

[11] 4,306,235
[45] Dec. 15, 1981

[54] MULTIPLE FREQUENCY MICROWAVE ANTENNA

[75] Inventor: Richard M. Christmann, Wichita, Kans.

[73] Assignee: CBC Corporation, Wichita, Kans.

[21] Appl. No.: 957,177

[22] Filed: Nov. 2, 1978

[51] Int. Cl.³ .................... G01S 13/00; H01P 1/00
[52] U.S. Cl. ............................. 343/5 DD; 329/161; 333/248; 343/100 AM; 343/781 P
[58] Field of Search ................................ 333/248, 209; 343/781 P, 781 CA, 100 AM, 5 DD; 455/281, 328, 83; 329/160, 161

[56] References Cited

U.S. PATENT DOCUMENTS

| | | | |
|---|---|---|---|
| 2,543,621 | 2/1951 | Denis | 455/281 |
| 2,832,885 | 4/1958 | Brett | 329/161 X |
| 2,901,613 | 8/1959 | Patterson et al. | 329/204 |
| 2,942,260 | 6/1960 | Carter | 343/756 |
| 3,094,663 | 6/1963 | Siegel | 343/18 E X |
| 3,238,529 | 3/1966 | Bock | 329/161 X |
| 3,257,659 | 6/1966 | Siegel | 343/18 E X |
| 3,408,574 | 10/1968 | Schmidt et al. | 343/18 E X |
| 3,465,253 | 9/1969 | Rittenbach | 343/18 E X |
| 3,521,288 | 7/1970 | Schell | 343/781 X |
| 3,550,008 | 12/1970 | Bright | 343/18 E X |
| 3,569,974 | 3/1971 | McLeod, Jr. | 333/248 X |
| 3,613,010 | 10/1971 | Podolski | 343/894 X |
| 3,617,953 | 11/1971 | Kingma et al. | 333/248 X |
| 3,680,144 | 7/1972 | Low et al. | 343/781 R |
| 3,750,171 | 7/1973 | Faris | 343/5 DD X |
| 3,763,493 | 10/1973 | Shimada et al. | 343/781 X |
| 3,774,223 | 11/1973 | Ehrenspeck et al. | 343/779 |
| 4,058,812 | 11/1977 | Stanislaw | 343/781 P X |
| 4,156,861 | 5/1979 | DeMambro et al. | 329/161 X |
| 4,196,393 | 4/1980 | Schweitzer | 343/5 DD X |

OTHER PUBLICATIONS

"Magnetic Jigs Simplify Diode Measurements", EDN Testing Methods Cover Story, EDN-Dec. 1963, pp. 44-45.
"Schottky Diode Receivers for Operation in the 100-1000 GHz Region", by Brian J. Clifton, The Radio & Electronic Engineer, vol. 49, No. 7/8, 333-346, Jul.-/Aug. 1979.

Primary Examiner—Malcolm F. Hubler
Attorney, Agent, or Firm—Fishburn, Gold and Litman

[57] ABSTRACT

A microwave antenna for use at a limited number of non-harmonically related frequencies, particularly two, includes a pair of reflectors, a detector diode, and a modulator diode mounted on a waveguide in operative spatial relationships which are compromises of closely occurring multiples of half or quarter wavelengths of the frequencies of interest. More particularly, the reflectors are spaced apart such a compromise distance which results in a low voltage standing wave ratio. The antenna includes a coaxial detector diode holder or sidearm positioned on the waveguide and in communication therewith at a position to provide sharp tuning at one of the frequencies while the detector diode is positioned in a coaxial diode holder at a location operative to sharply tune the other frequency. The modulator diode is positioned in the waveguide a distance from the detector diode holder which is a compromise distance based on in-guide half wavelengths at each of the frequencies. The antenna includes impedance matching structures associated with the aperture of the waveguide, the modulator diode, and the detector diode and holder to thereby increase the efficiency of the antenna. A backshort tuning screw is provided to adjust the effective electrical length of the waveguide.

9 Claims, 11 Drawing Figures

U.S. Patent Dec. 15, 1981 Sheet 1 of 3 4,306,235
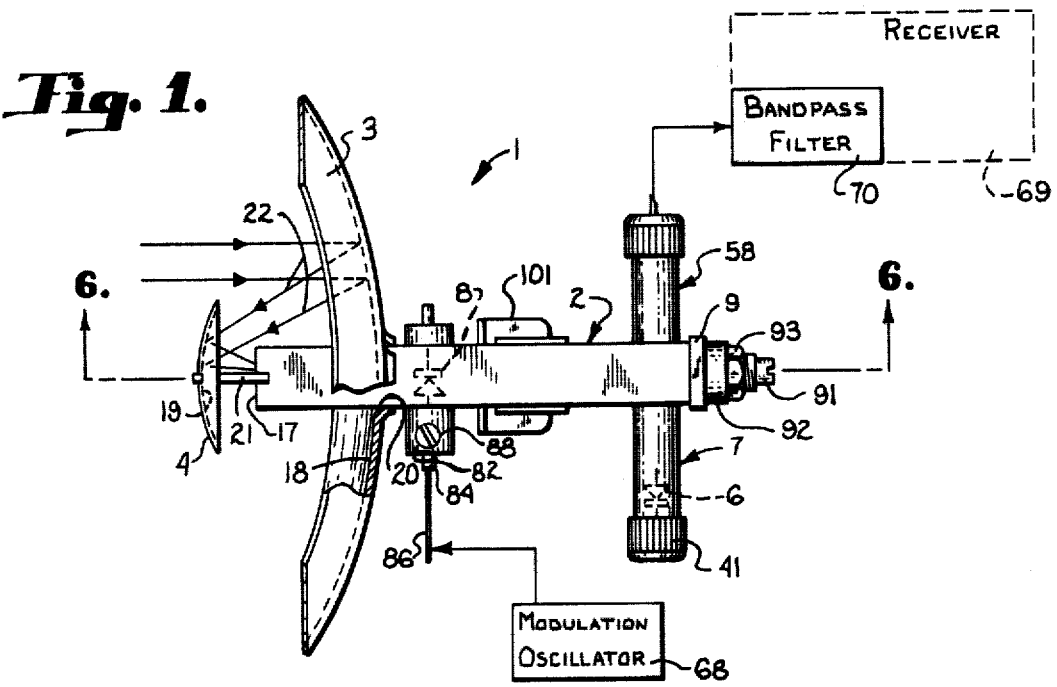
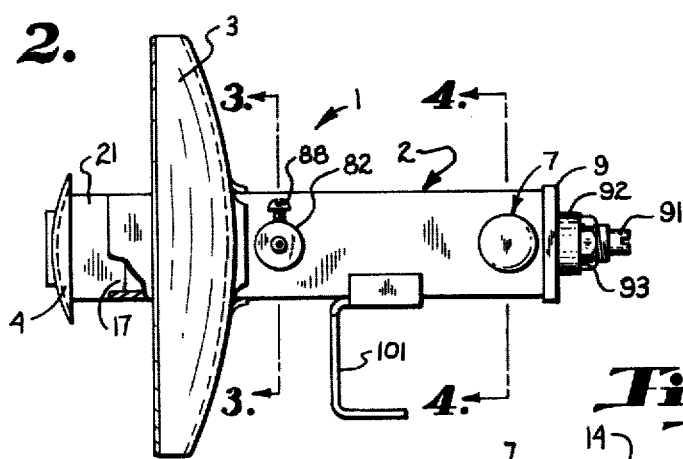
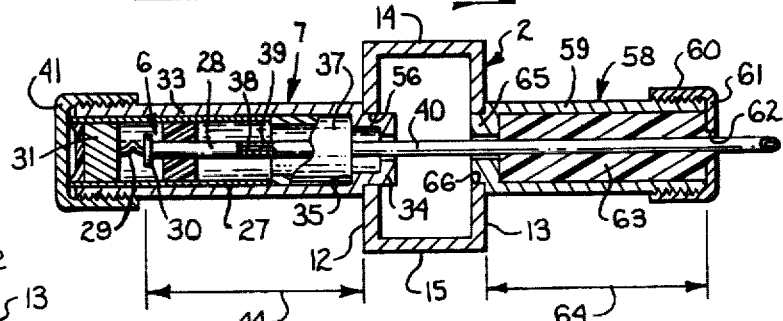
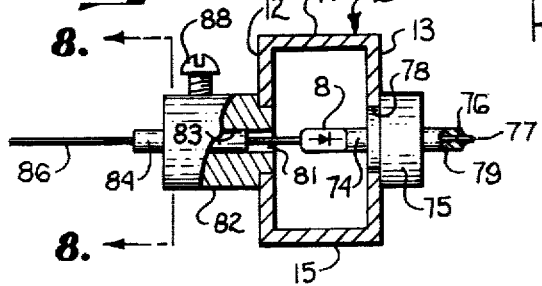

Fig. 9.
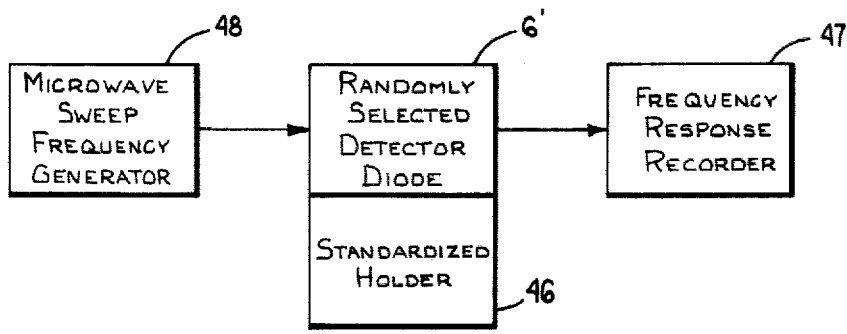
Fig. 10.
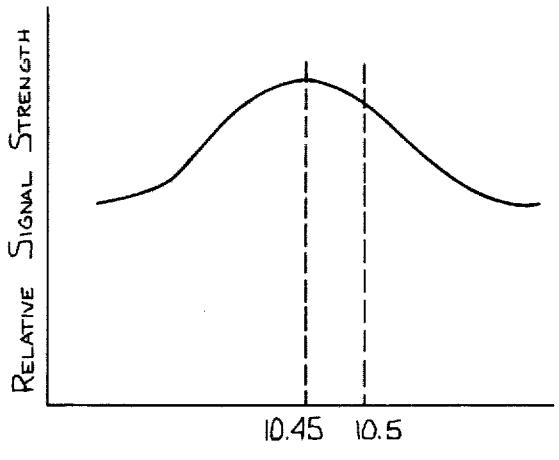
Fig. 11.
| Index Number Of Detector Diode | Correlated Length Of Spacer Sleeve (In.) |
|---|---|
| -3 | 0.205 |
| -2 | 0.210 |
| -1 | 0.214 |
| 0 | 0.217 |
| 1 | 0.220 |
| 2 | 0.224 |
| 3 | 0.229 |

MULTIPLE FREQUENCY MICROWAVE ANTENNA

The present invention relates to microwave antennas and more particularly to such an antenna for use at two non-harmonically related frequencies wherein the elements of the antenna are spaced apart distances which are empirical compromises of multiples of half wavelengths of each of the frequencies.

In general, microwave receiving antennas are designed either as broadband antennas or as antennas for a single frequency or band of frequencies. In one multiple frequency antenna used heretofore, a conducting plate is provided with a slot having dimensions to tune a lower frequency and a shorting bar or modulator diode placed across the slot in such a manner to tune a higher frequency. Another multiple frequency antenna includes a pair of waveguides with horn terminations together with a main reflector and a pair of sub-reflectors arranged to focus signals of two frequencies to the proper waveguide. The slot antenna, while simple in construction, is also low in gain. The multiple waveguide antenna, on the other hand, has a relatively high gain; however, the use of multiple sub-reflectors focusing to spaced apart locations is quite complicated geometrically, and therefore, expensive to manufacture with precision.

The principal objects of the present invention are: to provide a method for receiving at least two non-harmonically related microwave frequencies; to provide a microwave antenna for carrying out such a method; to provide such an antenna including frequency determining elements which are spaced apart distances which are compromises between closely occurring multiples of half or quarter wavelengths of each of the frequencies which results in optimum performance; to provide such an antenna including a single elongated waveguide, a pair of reflectors, a detector diode, and a modulator diode constructed in operative spatial relationship to tune each of the desired frequencies; to provide such an antenna including impedance transforming and controlling arrangements; to provide such an antenna in combination with a modulation oscillator operating at a modulation frequency and a bandpass filter circuit tuned to the modulation frequency; to provide such an antenna wherein critical post-assembly adjustments are minimized; to provide such an antenna which can be produced with acceptable precision in large quantities; and to provide such a microwave antenna which is economical to manufacture, durable, precise, and efficient in operation, and which is particularly well adapted for its intended purpose.

Other objects and advantages of this invention will become apparent from the following description taken in connection with the accompanying drawings wherein are set forth, by way of illustration and example, certain embodiments of the present invention.

The drawings constitute a part of the specification, include an exemplary embodiment of the present invention, and illustrate various objects and features of the multiple frequency microwave antenna.

FIG. 1 is a top plan view of the multiple frequency microwave antenna and includes diagrammatic blocks representing a modulation oscillator and a bandpass filter connected to the antenna.

FIG. 2 is a side elevational view of the microwave antenna with portions broken away to illustrate details thereof.

FIG. 3 is an enlarged transverse sectional view taken along line 3—3 of FIG. 2 and illustrates mounting and impedance controlling details of the modulator diode.

FIG. 4 is an enlarged transverse sectional view taken along line 4—4 of FIG. 2 and illustrates details of the detector diode holder and the video side arm.

FIG. 9 is a block diagram schematically illustrating an arrangement for determining the frequency response of a detector diode.

FIG. 10 is a graph showing the frequency response of a diode in a standardized setup.

FIG. 11 is a table showing an exemplary correlation between index numbers of the detector diodes and the lengths of respective spacer sleeves for use therewith.

Figure 5:
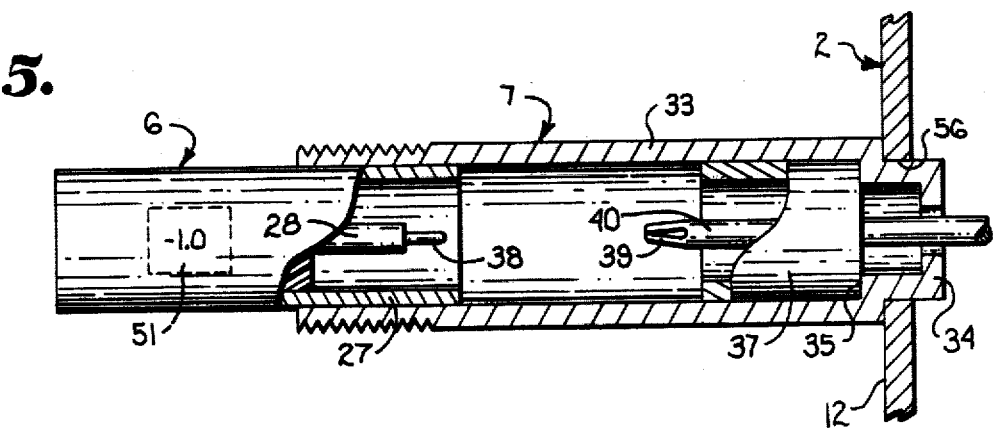
FIG. 5 is a greatly enlarged fragmentary longitudinal sectional view of the detector diode holder with parts thereof disassembled for clarity.

The herein disclosed embodiments of the present invention are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a microwave antenna for use particularly at two non-harmonically related frequencies. The antenna 1 generally includes a waveguide 2 having a main reflector 3 and a sub-reflector 4 mounted thereon and operative to admit microwave signals of the frequencies of interest into the waveguide. The antenna 1 includes a detector diode 6 mounted in a detector diode holder or sidearm 7 for converting microwave signals coupled thereto to electrical signals. Preferably, the antenna 1 includes a modulator diode 8 positioned in the waveguide 2 and operative to chop or gate microwave signals therepast by effecting open and short circuit conditions in the waveguide in respective off-and on-states of the modulator diode. In the antenna 1, the position of the diode 6 in the holder 7, the position of the holder 7 along the waveguide in relation to a backshort 9 of the waveguide, the spacing of the modulator diode 8 from the position of the detector diode sidearm 7, and the ray spacing between the main and sub-reflectors, 3 and 4 respectively, all cooperate to render the antenna 1 responsive at the desired frequencies.

The waveguide 2 is preferably a tubular, rectangular cross section waveguide including a pair of broad walls 12 and 13 and a pair of narrow walls 14 and 15. The manner in which a signal is propagated in a waveguide is known as the mode of propagation and is determined by the cross-sectional dimensions of the waveguide in relation to the frequency of the signal. In the waveguide 2, the mode of interest is the fundamental transverse electric, or TE$_{10}$, mode since voltage and current maxima and minima occur at spacings equal to one half the in-guide wavelength of the frequency of the signal. The waveguide 2 is characterized by a minimum cutoff frequency or wavelength, below which signals cannot propagate therethrough. The upper frequency limit of utility of the waveguide is determined by what is termed "moding" in which the signal is propagated in a mode other than the fundamental mode. Both limits are determined by the cross-sectional dimensions of the waveguide. The in-guide wavelength $\lambda g$ of a signal is determined by the formula:

$$\lambda g = \frac{\lambda}{\sqrt{1 - \left(\frac{\lambda}{\lambda c}\right)^2}}$$

relating the free space wavelength $\lambda$ to the cutoff wavelength $\lambda c$ of the waveguide 2.

There is a certain range of usable frequencies for a waveguide of given dimensions, and the frequencies for which the antenna 1 of the present invention is designed must be close enough that both frequencies can be propagated in the fundamental mode in a single size waveguide. Waveguides are manufactured in standard sizes; and since waveguides are relatively expensive components, it is desirable that standard size waveguides be used in constructing the antenna 1. As an example, the antenna 1 could be constructed for use at 10.525 gigahertz, or nominally 10.5 GHz, in the X-band and at 24.125 GHz, or nominally 24 GHz, in the K-band. For these frequencies, it is determined that a waveguide designated WR62 be used. This waveguide has internal dimensions of 0.622 by 0.311 inches and has a lower cutoff frequency of 9.486 gigahertz. It is normally used in the K$_u$-band from 12.5 to 18 GHz; however, with caution and precise construction it can be employed successfully at these two frequencies without moding problems.

The antenna 1 includes front end means for admitting microwave signals into the waveguide 2. Such means could include a horn tapered into the waveguide; however, in the preferred embodiment, the front end means includes the main reflector 3 and sub-reflector 4 cooperating to focus the microwave signals into the front opening or aperture 17 of the waveguide 2. Preferably, the reflecting surface 18 of the main reflector 3 has a shape which is a surface of revolution of a parabola about its axis. The sub-reflector 4 has a reflecting surface 19 which is sperical.

The main reflector or dish 3 and sub-reflector or splash plate 4 may be mounted on the waveguide 2 in any suitable manner. In the form illustrated, the dish 3 has a mounting hole 20 formed therein to receive the waveguide 2 therethrough for attachment intermediate the opposite ends thereof, as by soldering, brazing, or the like. The splash plate 4 is mounted on a septum 21 projecting from means forming the aperture 17 of the waveguide 2. The dish and splash plate 3 and 4 are mounted in such a manner that the respective reflecting surfaces 18 and 19 are in axially aligned, mutually facing relation. Both parabolic and sperical reflecting surfaces have the ability to focus signals to respective foci thereof which are located at positions along axes thereof determined by the relative dimensions of the reflecting surfaces. By proper relative spacing of the reflectors, certain frequencies can be tuned and others rejected. Therefore, the reflector interspacing and the relative shape of the reflecting surface 18 and the radius of curvature of the spherical surface 19 are interdependent in tuning a desired frequency.

Ordinarily, in order to tune a single frequency by means of the reflector 3 and 4, it is necessary to space the reflectors apart a distance such that the ray distance therebetween is substantially equal to an integral number of half wavelengths at that frequency. Referring to FIG. 1, it can be shown that, in optical terms, over major portions of the reflecting surfaces 18 and 19, the ray distance 22, that is, the distance travelled by rays reflected therebetween, is constant. According to the present invention, in order to tune two non-harmonically related frequencies, the reflectors 3 and 4 are spaced apart an axial distance 23 (see FIG. 6) such that the ray distance 22 therebetween is a compromise between closely occurring integral multiples of half wavelengths of each of the frequencies which results in an acceptable voltage standing wave ratio between the reflectors at both frequencies. It should be appreciated that the axial spacing 23 would equal the ray distance 22 between a similarly spaced, perfectly shaped parabolic reflector 3 and sperical reflector 4. However, during formation of the mounting hole 20, the periphery surrounding same is distorted somewhat.

As an example, a half wavelength at 10.5 GHz is approximately 0.56 inches, while a half wavelength at 24 GHz is approximately 0.244 inches. An example of closely occuring multiples of these half wavelengths, that is, respective multiples of half wavelengths of these frequencies that are nearly similar in length is two: half wavelengths at 10.5 GHz, approximately 1.12 inches, and five half wavelengths at 24 GHz, approximately 1.22 inches. Therefore, for these two frequencies the ray distance 22 between the main reflector 3 and the sub-reflector 4 will fall somewhere between 1.12 and 1.22 inches. The exact spacing is then adjusted such that the voltage standing wave ratio is a minimum at each of the frequencies, thereby maximizing the transfer of the microwave signals at those frequencies into the waveguide. It is possible that other combinations of multiples of the half wavelengths might be similar enough in length to tune the desired frequencies. The choice of a particular combination will be determined by the overall dimensions desired of the antenna 1.

In the example given, the optimum reflector spacing 23 was determined to be about 1.17 inches. It has been found that such spacing admits not only the frequencies mentioned, 10.5 and 24 GHz, but two others as well; namely, one between 17 and 18 GHz and another at about 20 GHz. If it is desirable to receive all four frequencies, no further frequency selection measures need to be taken. However, if the last two mentioned frequencies are not desirable, measures must be taken in order to reject them. Such measures could include suitable tuning circuits connected to the detector diode 6 which are tuned to 10.5 and 24 GHz. However, it is preferred that further frequency selection measures be provided in the antenna itself. In the antenna 1, these measures include, in part, tuning the detector diode sidearm 7 to one of the desired frequencies and tuning a rear portion 25 (see FIG. 6) of the waveguide 2 to the other desired frequency.

With reference to FIGS. 4 and 5, the detector diode 6 is, preferably, a coaxial package, point contact type of diode including a cylindrical outer conductor 27 forming one terminal, such as the cathode, of the diode 6 and an inner conductor 28 forming the other terminal, such as the anode. The actual junction of the diode 6 is formed at the point of contact between a catwhisker 29 and a semiconductor chip 30. The whisker 29 is connected by means of an end shorting plug 31 to the outer conductor 27, while the chip 30 is connected to the center pin 28.

The sidearm 7 includes an elongated conductive tubular outer member 33 sized to receive the detector diode 6 snugly therein. The outer member 33 is provided with a transition section 34 having a smaller diameter than the outer member 33 and by means of which the sidearm 7 is joined to the waveguide 2. A shoulder or abutment 35 is formed where the transition section 34 meets the outer member 33. The sidearm 7 includes a tubular spacer sleeve 37 received in the outer member 33 and in abutment with the shoulder 35 in order to position the detector diode 6 in the sidearm 7 for resonance at the desired frequency. The inner conductor or center pin 28 includes a narrowed tip 38 on the free end thereof to receive the tubular end 39 of a probe 40 thereon. The probe 40 extends coaxially through the spacer 37 and the transition section 34 into the waveguide 2 and provides an external connection to the anode of the diode 6 by way of the chip 30. The spacer 37 and diode 6 may be retained within the sidearm 7 by any convenient means, such as by a conductive cap 41 threaded onto the free end of the sidearm 7 and in electrical contact therewith.

In general, the sidearm 7 is tuned to resonance at a desired frequency by appropriate spacing of the semiconductor chip 30 from the wall of the waveguide 2 to which the sidearm is attached. Because of the relatively complicated configuration of the sidearm and the diode 6, the spacing 44 is determined most readily by empirical means. Due to manufacturing tolerances, the characteristics of the detector diode 6 vary from diode to diode. For this reason, it is not possible to tune the sidearm 7 with a single length of the spacer 37. If it were necessary to determine the chip spacing 44 empirically for the respective diode 6 of each antenna 1 assembled, labor costs would be prohibitively high. However, the present invention provides a method for accurately and quickly tuning the sidearm 7 to resonance at the desired frequency.

With reference to FIG. 9, a randomly selected detector diode 6' is positioned in a standardized holder 46 in order to determine the frequency response of the diode. The standardized holder 46 may be a type of setup which is reactively tunable in order to simulate the electrical characteristics of the sidearm 7 and the waveguide 2. The diode 6' is connected to a frequency response recorder 47 which may be an oscilloscope, a chart recorder, or the like. A microwave signal from a microwave sweep frequency generator 48 is then applied to the diode 6'. The signal from the generator 48 varies in frequency over a range or bandwidth extending below, including, and extending above a center frequency of interest, in this case 10.5 GHz. The recorder 47 plots relative signal strength as a function of frequency, with a peak in the curve occurring at the resonant frequency of the randomly selected diode 6' in the standardized holder 46. As an example and with reference to FIG. 10, the diode 6' is determined to have a resonant peak at 10.45 GHz.

In order to identify the determined frequency response for each randomly selected diode 6' in a simple manner, each diode 6' is marked with an index number 51. The index numbers 51 correspond to increments of frequency discrepancy above and below the frequency of interest. For example, each index number 51 may correspond to a frequency increment of 50 megahertz (MHz). In the illustrated example, the diode 6' was found to have a resonance at 10.45 GHz; therefore, the diode would be marked with a "−1.0" indicating that the frequency response thereof is 50 MHz below the frequency of interest, 10.5 GHz.

It will be necessary to determine empirically the required position of at least one diode of each index number in the sidearm 7 for resonance at the frequency of interest, or, alternatively, a statistically satisfying quantity of diodes of each index number. The respective length of the spacer sleeve 37 for each index number 51 can then be determined from the respective "required position" knowing the length of the detector diode 6. The index numbers 51 are correlated to the respective lengths 52 of the sleeves 37 for use therewith, such as by providing a table 53 (see FIG. 11) listing the index numbers 51 and correlated lengths 52. The spacer sleeves 37 are provided in the required lengths and may be arranged in respective groups at the assembly station (not shown). An assembler randomly selects a diode 6' having a marked index 51, refers to the table 53, and selects the proper spacer sleeve 37. The table 53 shown in FIG. 11 is exemplary in nature and does not necessarily refer to spacers for use with any actual diode 6', since the correlation therebetween must be determined by the actual characteristics and dimensions specified for the diodes.

Since the antenna 1 is intended for use at two frequencies, the detector diode sidearm 7 must be tuned in some manner to both of the frequencies. This may be accomplished by the method described above during the step for empirically determining the required position in the sidearm 7 of the diodes 6 for resonance. The result will be a slight adjustment in the lengths of the spacers 37 in order to tune the higher frequency in the sidearm 7. The sidearm 7 will, therefore, be sharply tuned to the lower frequency, 10.5 GHz, and broadly tuned to the higher frequency, 24 GHz.

In order to sharply tune the higher frequency, 24 GHz, the rear portion 25 of the waveguide 2 bounded by the probe 40 and backshort 9 is tuned to that frequency. That is accomplished by joining the sidearm 7 to the waveguide at such a location that the probe 40 is spaced from the backshort 9 a distance which is substantially an integral number of in-guide half wavelengths of the higher frequency. In the antenna 1 illustrated, the probe-to-backshort spacing 55 (see FIG. 6) is equal to about 0.3 inches which is slightly longer than one in-guide wavelength of 24 GHz. The spacing 55 is slightly longer than one in-guide half wavelength since the presence of the probe 40 in the waveguide causes an apparent foreshortening of the effective electrical length of waveguide behind the probe. Therefore, a slight lengthening is required to compensate for the presence of the probe. The sidearm 7 may be joined to the waveguide by forming a hole 56 in one of the broad walls, such as the wall 12, of the waveguide 2 to receive the transition section 34 therein. The transition section 34 extends a short distance into the waveguide 2 to cooperate with the probe 40 in coupling microwave signals from the waveguide 2 into the sidearm 7.

As stated hereinabove, the probe 40 provides a means of connecting the detector diode 6 to external circuitry. While it would be possible to extend the probe 40 through the other broad wall 13 to the outside of the waveguide 2 through an opening therein, such an opening would allow rf energy to escape therethrough. Such escaping energy might cause conditions whereby the flow of microwave energy within the waveguide 2 would be affected and, further, a lead connected to the probe 40 would require precise placement in order to prevent disturbance of the energy within the waveguide 2. In order to prevent these undesired effects, the antenna 1 includes a video sidearm structure 58 to trap rf energy to thereby prevent leakage thereof from the waveguide 2.

Referring to FIG. 4, the video sidearm 58 is similar in construction in some respects to the detector diode sidearm 7. The video sidearm 58 includes an outer conductor member 59 positioned coaxially about the probe 40 and a conductive cap 60 having an end wall 61 with a hole 62 therein for the exit of the probe 40. Preferably, the video sidearm 58 includes a dielectric insulator 63 positioned within the outer conductor 59 in surrounding relation to the probe 40 in order to maintain the probe 40 in coaxial relation within the outer member 59. The outer member 59 has a length selected to position the end wall 61 a distance 64 from the plane of the wall 13 of the waveguide 2 operative to reflect a short circuit condition back to the wall 13. In the illustrated antenna 1, the distance 64 is a compromise of closely occurring odd integral multiples of quarter wavelengths of each of the frequencies of interest which reflects the desired short circuit condition to the wall 13. The short circuit condition occurring at the wall 61 of the cap 60 is not a perfect resistive short because of the presence of the hole 62 therein. Therefore, the distance 64 requires empirical adjustment for optimum conditions to compensate therefor. The outer member 59 may be joined to the broad wall 13 in a manner similar to that of the outer member 33 of the detector diode sidearm 7 to the wall 12. A necked down portion 65 is provided on the outer member 59 and a hole 66 is formed in the wall 13 for this purpose. The outer member 59 may be bonded to the wall 13, as by brazing.

The antenna 1 may be connected for use with any suitable type of receiver. If the antenna 1 is intended for use in receiving particularly unmodulated microwave signals, further frequency selection at the desired frequencies can be accomplished by chopping or modulating the microwave signal in the waveguide 2 at a suitable distance from the probe 40. Modulation of the signal in the waveguide is accomplished by applying a substantially square wave signal from a modulation oscillator 68 to the modulator diode 8 which effects substantially open and short circuit conditions within the waveguide in respective off and on states of the diode 8. The modulation oscillator 68 preferably has an audio frequency output signal, such as a signal at one kilohertz (KHz). The modulated microwave signal is coupled to the detector diode 6 which is operative to convert same to an electrical signal having the same frequency. The electrical signal is then applied to a receiver 69 through a bandpass filter 70 which is tuned to the modulation frequency of 1 KHz. The receiver 69 thereby receives the modulation envelope of the signal detected by the diode 6 and rejects the radio frequency components thereof. A receiver particularly compatible with the antenna 1 is disclosed in a copending application entitled RADAR RECEIVER AND METHOD OF INDICATING RANGE TO A RADAR SOURCE, Ser. No. 907,510, which was filed May 19, 1978, now U.S. Pat. No. 4,182,990 issued Jan. 8, 1980, and of which I am a co-inventor.

By suitable location of the modulator diode 8, microwave signals at the desired frequencies will be modulated whereas signals of other frequencies will not be effectively modulated and, therefore, will be rejected by the bandpass filter 70. For effective modulation, the modulator diode 8 is spaced from the probe 40 a distance 72 which is a compromise between closely occurring in-guide half wavelengths of each of the frequencies desired which results in an acceptable level of the electrical signal from the detector diode 6. Preferably, the combination of multiples of half wavelengths for the distance 72 is different from the combination of multiples for the reflector interspacing 23 so that undesired frequencies admitted into the waveguide as a result of the reflector spacing are not effectively modulated. In the illustrated antenna 1 for 10.5 and 24 GHz, the spacing 72 is a compromise of one in-guide half wavelength of 10.5 GHz and six in-guide half wavelengths of 24 GHz.

Microwave electromagnetic energy propogated within the waveguide 2 may be characterized as phase related standing wave patterns. Voltage and current nodes or maxima are distributed along the length of the waveguide at respective in-guide half wavelength intervals, with the voltage nodes spaced at in-guide quarter wavelength from the current nodes. Preferably, the modulator diode 8 is positioned at a voltage node. At such a position, the diode 8 is able to shut-off, gate, or chop the flow of microwave energy through the waveguide during the forward bias of, and resulting current flow through, the diode 8. The modulation signal is an AC square wave which alternately forward biases and reverse biases the diode 8. During the reverse bias, no current flows through the diode 8, and the waveguide is returned to a normal condition such that the microwave signal is able to flow therethrough. Ideally, the forward bias or on-state of the diode 8 effects an apparent short circuit condition in the waveguide while the reverse bias or off-state effects an open circuit condition therein. However, the diode 8 is not ideal, having resistance and inductance in the on-state and capacitance in the off-state. In order to improve the modulation efficiency or percentage at the desired microwave frequencies, structure is provided in the waveguide 2 in order to establish selected reactances therein to thereby match the impedance of the diode 8 in the on and off states to the impedance of the waveguide 2.

With reference to FIG. 3, a ground stub 74 is provided to effect matching of the impedance of the diode 8 to the impedance of the waveguide 2. The stub 74 is a conductive, cylindrical projection from a ground stub bushing 75. The stub 74 and bushing 75 include a bore 76 therethrough to receive one lead, such as the cathode lead 77 of the diode 8, therethrough. The bushing 75 is received in a hole 78 formed in one of the broad walls, such as the wall 13, and bonded thereto, as by brazing. The lead 77 may be fixed in electrical contact with the stub 74, as by soldering same to an external projection 79 of the bushing 75.

Figure 8:
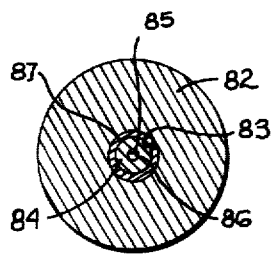
FIG. 8 is an enlarged transverse sectional view taken along line 8—8 of FIG. 3 and illustrates a feedthrough sleeve insulated from the feedthrough bushing of the modulator diode.

The other broad wall 12 is provided with a tuned coaxial cavity 81 for matching purposes. The outer conductor of the cavity 81 is formed by a conductive feedthrough bushing 82 having a bore 83 therethrough to receive a feedthrough sleeve 84 therein. The sleeve 84 has a bore 85 therethrough to receive the other lead 86, the anode lead, of the modulator diode 8 therethrough. The lead 86 forms the center conductor of the cavity 81. The sleeve 84 is insulated from the bushing 82. Preferably, the sleeve 84 is aluminum and the insulation therefor is an anodized coating 87 (see FIG. 8). The sleeve 84 may be held in position within the bore 82 by means of a set screw 88, preferably, a nylon screw to prevent damage to the anodized coating 87 on the sleeve 84.

The length of the ground stub 74 and the coaxial cavity 81 are determined most practically by empirical means. The insulated feedthrough sleeve 84 not only cooperates to form the cavity 81, but additionally forms a capacitance trap in cooperation with the bushing 82 to prevent the escape of microwave energy through the exit provided for the lead 86. The modulation oscillator 68 is connected to the diode 8 by means of the lead 86.

Figure 6:
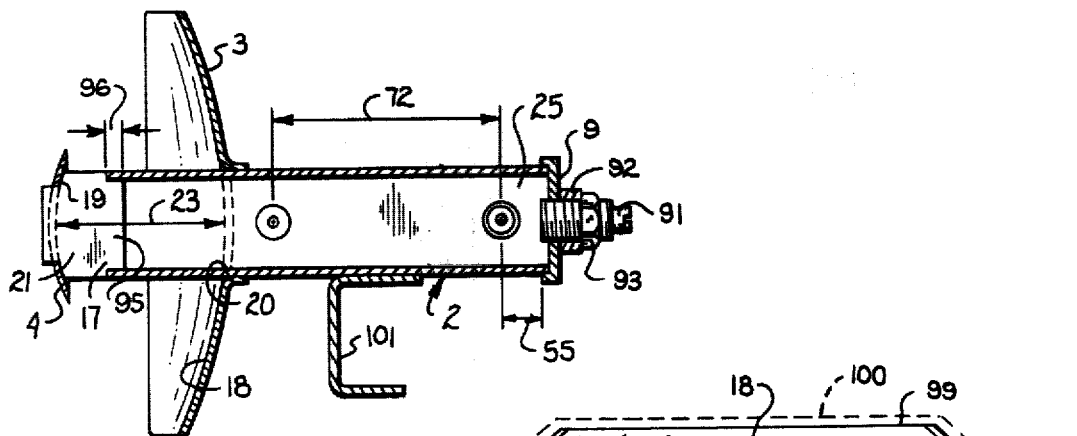
FIG. 6 is a longitudinal sectional view of the antenna taken along line 6—6 of FIG. 1 and illustrates critical spacing between the component parts thereof.

In order to compensate for minor variations in the size and fit of the various parts of the antenna 1, a conductive backshort tuning screw 91 is provided (see FIG. 6). A threaded collar 92 is provided on the plate forming the backshort 9. The screw 91 is received in the collar 92 and is adjusted for optimum performance as a final step in the assembly of the antenna 1. A lock nut 93 is received on the screw 91 to secure same in the adjusted position.

In order to maximize the transfer of microwave energy into the waveguide 2, impedance transformer means is provided in the antenna 1. The transformer means consists of an extension 95 of the septum 21. The extension 95 projects into the waveguide 2 a distance 96 operative to transform the free space impedance of a microwave signal to the characteristic impedance of the waveguide 2. The distance 96 is determined by empirical means.

Figure 7:
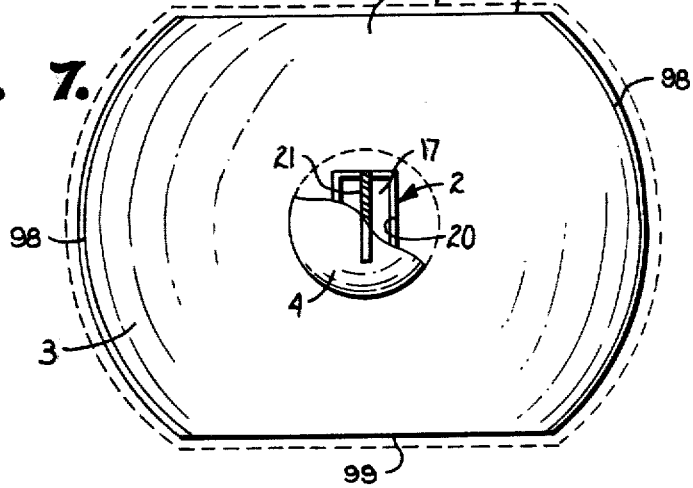
FIG. 7 is a front elevational view of the antenna with portions broken away and illustrating details of the reflectors.

As illustrated in FIG. 7, the main reflector 3 has circular side margins 98 and flat top and bottom margins 99. While the reflector may be fully circular, top and bottom sections are advantageously truncated to reduce the overall dimensions of the antenna 1 for enclosure within a protective housing 100 having an esthetically pleasing shape. The antenna 1 is provided with a mounting bracket 101 which may be attached to the waveguide 2, as shown in FIGS. 2 and 6.

In summarizing, the present invention discloses an improved method of detecting the presence of microwave signals of either of two selected non-harmonically related frequencies and an antenna 1 for carrying out the method. The antenna 1 includes a single waveguide 2 and sets of tuning elements functionally associated with the waveguide 2 and operative to determine the frequency response of the antenna 1 by means of the tuning distance therebetween. The spacings are empirical compromises between respective multiples of half wavelengths of each of the selected frequencies that are nearly similar in length which results in performance which is acceptable, preferably optimum, at both of the selected frequencies. The sets of tuning elements particularly include the reflectors 3 and 4 and the spacing 23 therebetween and the modulator diode 8 and probe 40 and the spacing 72 therebetween. The spacing 72 is determined in terms of in-guide half wavelengths. The antenna 1 is provided with additional frequency selection by means of the tuning of the detector diode sidearm 7 and the rear portion 25 of the waveguide 2.

While certain forms of the present invention have been described and illustrated, it is not to be limited thereto except insofar as such limitations are included in the following claims.

What I claim:

1. A microwave antenna responsive at two selected non-harmonically related frequencies comprising:
   (a) an elongated waveguide capable of propagating therethrough microwave signals of either of two selected non-harmonically related frequencies in the fundamental mode, said waveguide having a single resonating chamber therein, an aperture at a front end, and a backshort at a rear end thereof;
   (b) front end means operatively associated with said aperture to admit microwave signals at said frequencies into said waveguide;
   (c) an elongated coaxial detector diode sidearm operatively joined to said waveguide;
   (d) a single detector diode received in said sidearm and operative to provide an electrical signal in response to a microwave signal coupled into said sidearm;
   (e) said diode being positioned in said sidearm whereby the combination of said sidearm and diode is sharply tuned to the lower of said frequencies and broadly tuned to the higher of said frequencies; and
   (f) said sidearm includes a probe connected to said diode and projecting through said waveguide at a position spaced from said backshort operative to sharply tune the portion of said waveguide between said probe and said backshort to the higher of said frequencies thereby coupling microwave signals of said higher frequency into said sidearm, said electrical signal in response to the coupled microwave signals being provided on said probe.

2. An antenna as set forth in claim 1 wherein:
   (a) said waveguide is rectangular in cross section, having a pair of broad walls; and
   (b) said detector diode includes a pair of terminals; and said detector diode sidearm includes:
   (c) an elongated conductive tubular member having one end joined to one of said broad walls, said tubular member having an abutment therein adjacent said one end of said tubular member;
   (d) a tubular conductive spacer sleeve received in said tubular member and in contact with said abutment;
   (e) said detector diode being coaxial in form, having an inner and an outer conductors connected respectively to said detector diode terminals;
   (f) said detector diode being received in said tubular member in abutment with said spacer sleeve, said outer conductor being in conductive contact with said tubular member;
   (g) said probe being electrically connected to said inner conductor and extending coaxially through said outer conductor and said spacer sleeve, and through said waveguide; and
   (h) a conductive end wall closing the end of said tubular member opposite said one end thereof.

3. An antenna as set forth in claim 1 wherein:
   (a) said front end means includes a set of two reflectors operatively mounted on said waveguide and spaced apart in such a manner that the ray distance therebetween is a compromise between respective multiples of one half wavelengths of each of said frequencies that are nearly similar in length which results in a voltage standing wave ratio between said reflectors which is acceptable at both of said frequencies;

(b) said antenna includes a single modulator diode operatively positioned in said waveguide at a distance from said probe which is a compromise between respective multiples of in-guide one half wavelengths of each of said frequencies that are nearly similar in length which results in a level of said electrical signal from said detector diode which is acceptable at both of said frequencies; and (c) the multiples associated with said reflectors are numerically different from the multiples associated with said modulator diode and said probe.

4. An antenna as set forth in claim 1 including:
(a) a single modulator diode operative to chop microwave signals passing through said waveguide; and
(b) said modulator diode being positioned in said waveguide at a distance from said probe which is a compromise between respective multiples of in-guide one half wavelengths of each of said frequencies that are nearly similar in length which results in a level of said electrical signal from said detector diode which is acceptable at both of said frequencies.

5. An antenna as set forth in claim 1 wherein:
(a) said front end means includes a set of two reflectors operatively mounted on said waveguide; and
(b) said reflectors are spaced apart a ray distance equivalent to a compromise between respective multiples of one half wavelengths of each of said frequencies that are nearly similar in length which results in a voltage standing wave radio between said reflectors which is acceptable at both of said frequencies.

6. An antenna as set forth in claim 1 wherein said frequencies are approximately 10.525 and 24.125 gigahertz (GHz) and wherein:
(a) said front end means includes two reflectors spaced apart a distance such that the ray distance therebetween is a compromise between one wavelength of 10.525 GHz and two and one half wavelengths of 24.125 GHz which results in a voltage standing wave ratio between said reflectors which is acceptable at both of said frequencies;
(b) said probe is spaced from said backshort a distance which is substantially one in-guide half wavelength of 24.125 GHz; and
(c) said antenna includes a modulator diode operatively positioned in said waveguide at a distance from said probe which is a compromise between one in-guide half wavelength of 10.525 GHz and three in-guide wavelengths of 24.125 GHz which results in a level of said electrical signal from said detector diode which is acceptable at both of said frequencies.

7. A method of detecting the presence of microwave signals at either of two selected non-harmonically related frequencies comprising the steps of:
(a) reflecting said microwave signals from a first reflector to a second reflector spaced therefrom a distance which is a compromise between respective multiples of half wavelengths of said frequencies that are nearly similar in length which results in a voltage standing wave ratio between said reflectors which is acceptable at both of said frequencies;

(b) focusing said microwave signals from said second reflector into a waveguide capable of propagating signals of either of said frequencies in the fundamental mode therethrough;
(c) coupling said microwave signals into a coaxial sidearm including a center probe projecting into said waveguide, said sidearm having a single detector diode positioned therein for sharp tuning of said sidearm with said diode therein to one of said frequencies to thereby couple signals of said one of said frequencies to said diode and for broad tuning to the other of said frequencies;
(d) sharply tuning a portion of said waveguide adjacent said probe to said other frequency to thereby couple signals of said other frequency to said detector diode;
(e) converting said microwave signals to electrical signals by means of said coupling said microwave signals to said detector diode; and
(f) indicating the presence of said electrical signals.

8. A method as set forth in claim 7 including the steps of:
(a) modulating said microwave signals at a position spaced along said waveguide from said probe a distance which is compromise between respective multiples of in-guide half wavelengths of each of said frequencies that are nearly similar in length which results in a level of said electrical signal which is acceptable at both of said frequencies, said modulating occurring at a selected modulation frequency; and
(b) filtering said electrical signal in a bandpass filter tuned to said modulation frequency.

9. A microwave antenna tuned to both 10.525 gigahertz and 24.125 gigahertz comprising:
(a) an elongated waveguide having rectangular cross-sectional dimensions of 0.622 inch by 0.311 inch, said waveguide having an aperture at a front end thereof and a backshort at a rear end thereof;
(b) a first reflector and a second reflector mounted on said waveguide adjacent said aperture, said reflectors having respective reflecting surfaces cooperating to focus microwave energy through said aperture into said waveguide, said reflectors providing a substantially constant ray distance between the reflecting surfaces over major portions of said surfaces, said ray distance being 1.17 inches;
(c) a single elongated coaxial detector diode sidearm operatively joined to said waveguide and having a single coaxial detector diode therein operative to provide an electrical signal in response to a microwave signal coupled into said sidewarm, said detector diode being positioned in said sidearm to sharply tune 10.525 gigahertz and to broadly tune 24.125 gigahertz;
(d) said coaxial sidearm including a central conductive probe connected to said detector diode and projecting through said waveguide at a position spaced from said backshort a distance of 0.30 inch to sharply tune the portion of said waveguide adjacent said probe to 24.125 gigahertz; and
(e) a single modulator diode positioned in said waveguide at a distance of 1.55 inches from said probe, said modulator diode being operative to chop signals of 10.525 gigahertz and 24.125 gigahertz passing through said waveguide.

* * * * *